(12) United States Patent
Lincoln

(10) Patent No.: US 11,215,267 B2
(45) Date of Patent: Jan. 4, 2022

(54) LINEAR INTERMITTENT GEAR DRIVE

(71) Applicant: Sealstrip Corporation, Gilbertsville, PA (US)

(72) Inventor: Robert E. Lincoln, Blandon, PA (US)

(73) Assignee: Sealstrip Corporation, Gilbertsville, PA (US)

( * ) Notice: Subject to any disclaimer, the term of this patent is extended or adjusted under 35 U.S.C. 154(b) by 172 days.

(21) Appl. No.: 16/782,727

(22) Filed: Feb. 5, 2020

(65) Prior Publication Data

US 2021/0239197 A1 Aug. 5, 2021

(51) Int. Cl.
*F16H 27/08* (2006.01)
(52) U.S. Cl.
CPC .................... *F16H 27/08* (2013.01)
(58) Field of Classification Search
CPC ....................................... F16H 27/08
See application file for complete search history.

(56) References Cited

U.S. PATENT DOCUMENTS

| | | | | |
|---|---|---|---|---|
| 1,026,100 | A * | 5/1912 | Lory | F16H 27/08 74/435 |
| 1,151,220 | A * | 8/1915 | Scherling | F16H 27/08 74/435 |
| 1,156,055 | A * | 10/1915 | Bullock | F16H 27/08 74/435 |
| 2,797,589 | A * | 7/1957 | Chaveneaud | F16H 27/08 74/436 |
| 2,898,775 | A * | 8/1959 | Reid | B21C 23/211 74/435 |

* cited by examiner

*Primary Examiner* — Terence Boes
(74) *Attorney, Agent, or Firm* — Greg Gore; Douglas J Ryder; Ryder, Mazzeo & Konieczny LLC

(57) ABSTRACT

A gearbox has a partly toothed drive gear wheel with a toothed segment and a toothless segment on its circular peripheral surface. A driven gear is completely toothed and meshes with the toothed segment of the drive gear when it is presented to a mesh point between the gears. Pawls on the gear shafts synchronize the initiation of the mesh. The number of teeth on the drive gear is selected so that 360 degrees of rotation of the drive gear results in 360 degrees of rotation of the driven gear. As the drive gear toothless segment just reaches the mesh point, a brake on the driven gear shaft is actuated to accurately stop the motion of the driven gear shaft. The driven gear shaft is thereby halted while the drive gear is free to turn until its teeth once again reach the mesh point.

18 Claims, 4 Drawing Sheets

LINEAR INTERMITTENT GEAR DRIVE

FIELD OF THE INVENTION

The present invention relates to mechanical drives in which continuous rotary motion is converted to intermittent rotary motion. More specifically it relates to intermittent drive systems in which meshing gear wheels produce a constant or linear output relative to the input.

BACKGROUND OF THE INVENTION

High precision and high-speed manufacturing equipment is ever more in demand. Motion control is most often provided by precisely programmed servo motors. Manufacturing equipment often requires a stop and start movement of components. As demands production speeds increase however, these precision motors need to stop and start and thus fail to decelerate and accelerate fast enough to meet the stop and start requirements.

One solution is to interface the servo motor drive with a mechanical transmission that accurately provides the stop and start operation without requiring the servo motor to stop. It could also provide an interruption in the transmission of power during a dwell period that reduces the inertia of the machine components so that the motor can stop and restart more quickly for positional indexing. Working against less inertial forces allows the servo motor to stop at an index point and then accelerate to a run speed more quickly.

There are known various transmission systems which convert continuous rotary motion to intermittent rotary motion. An example of such a system is Geneva drive. A problem with that type of drive system is that tight operating tolerances are required and jamming can occur. Power transmission is also limited by the high force distribution between the pins and slot engagement surfaces. Also, some applications require a constant or linear output which the Geneva drive does not provide.

There is therefore a need in the field of high-speed precision manufacturing motion control for a power transmission drive system that provides intermittent precise motion control with high force handling capability that produces a usable duration of linear power output.

SUMMARY OF THE INVENTION

In order to meet the need in the mechanical power transmission arts explained above the applicant has devised an intermittent gear drive system as further described. The main components of the system comprise a gearbox with a partly toothed drive gear wheel having a toothed segment and a toothless segment on its circular peripheral surface in which the drive gear teeth are absent. A driven gear is completely toothed and meshes with the toothed segment of the drive gear when they are presented to a mesh point between the gears. The toothed and toothless segments together span the entire 360 degrees of the drive gear outer surface. The number of teeth on the drive gear are selected so that 360 degrees of rotation of the drive wheel results in 360 degrees of rotation of the driven gear wheel. The basic operation of the present drive system is as follows.

As the meshing gear wheels turn and the drive gear toothless segment reaches the mesh point, a brake on the driven gear shaft is actuated to accurately stop the motion of the driven gear shaft. A dwell period then begins here where the driven gear shaft is halted and the mechanical linkage between the drive and driven gear shafts has been disconnected. The drive shaft is then free to continue turning or not, without the burden of the load of machine components downstream of the driven gear shaft.

As the drive gear continues to turn, a speed-synchronizing drive pawl on the drive gear engages a driven pawl on the driven gear to abruptly accelerate the driven gear to match the speed of the drive gear just prior to the leading end of its toothed segment reaching the mesh point. This ensures the smooth engagement of the two gear wheels as they continue to turn. The driven gear wheel is then turned by direct gear drive which provides a constant or linear relationship between the input and output shafts as they continue to rotate. This power transmission phase continues until the trailing end of the driven gear toothed segment reaches the mesh point. Here, the driven pawl has once again reached the mesh point and simultaneously the brake is then actuated to positively halt the driven shaft, thus completing the operational cycle.

More specifically, the applicant has devised a gear system for converting continuous rotary motion to intermittent rotary motion by a gearbox interposed between an input shaft and an output shaft. The input shaft is connected to a servo motor and the output shaft is connected to another shaft for driving machine components. A drive gear wheel is affixed to the input shaft which has two distinct coplanar arc segments on its peripheral circular outer surface, a toothed segment and a toothless segment. A driven gear wheel is affixed to the output shaft and has gear teeth throughout a 360-degree arc in meshing engagement with the toothed segment of the drive gear wheel during a position of engagement at a mesh point between the two gears.

As the meshed gears turn, they reach a position of disengagement when the trailing end of the toothed arc segment of the drive gear wheel leaves the mesh point. Simultaneously, a brake affixed to the output shaft is momentarily actuated by timed braking means on the input shaft. This occurs only currently when the shafts are initially in this position of disengagement. The brake preferably includes a cam and follower mechanism affixed to the input shaft. A single lobe cam on the input shaft operates upon a pivoted brake arm follower that in-turn operates the brake. The brake may be a disc brake or any other braking means that stops the movement of the output shaft.

The drive system further includes a pair of speed-synchronizing pawls, a first drive pawl affixed to the input shaft and a second driven pawl affixed to the output shaft. The pawls are located on their respective shafts such that the drive pawl comes into contact with the second driven pawl only when the shafts are otherwise disengaged and the brake is no longer applied. The pawls are arranged to disengage at a point of drive gear rotation where the teeth at the leading end of the toothed segment first meshes with the teeth of the driven gear wheel. This begins the main power transmission phase of the operating cycle which continues until the toothless portion of the drive gear reaches the mesh point interrupting the power transmission between the input and output shafts. The number of teeth on the drive gear is selected so that the driven pawl on the output shaft has returned to its starting position where it was first contacted and where the gear teeth no longer mesh. Simultaneously, the brake is timed to briefly halt the output shaft thus completing the operating cycle. By these relations 360 degrees of rotation of the drive gear results in 360 degrees of rotation of the driven gear.

It is thus the main object of the invention to devise a linear intermittent rotary drive system for high torque power transmission which can be successfully used with high-speed motion control systems. From the following drawings and detailed description of one embodiment of the invention it will be apparent to those of skill in the art that the main object of the invention to devise an intermittent rotary drive system which meets the need in the art has been achieved.

DESCRIPTION OF THE PREFERRED EMBODIMENT

Figure 1:
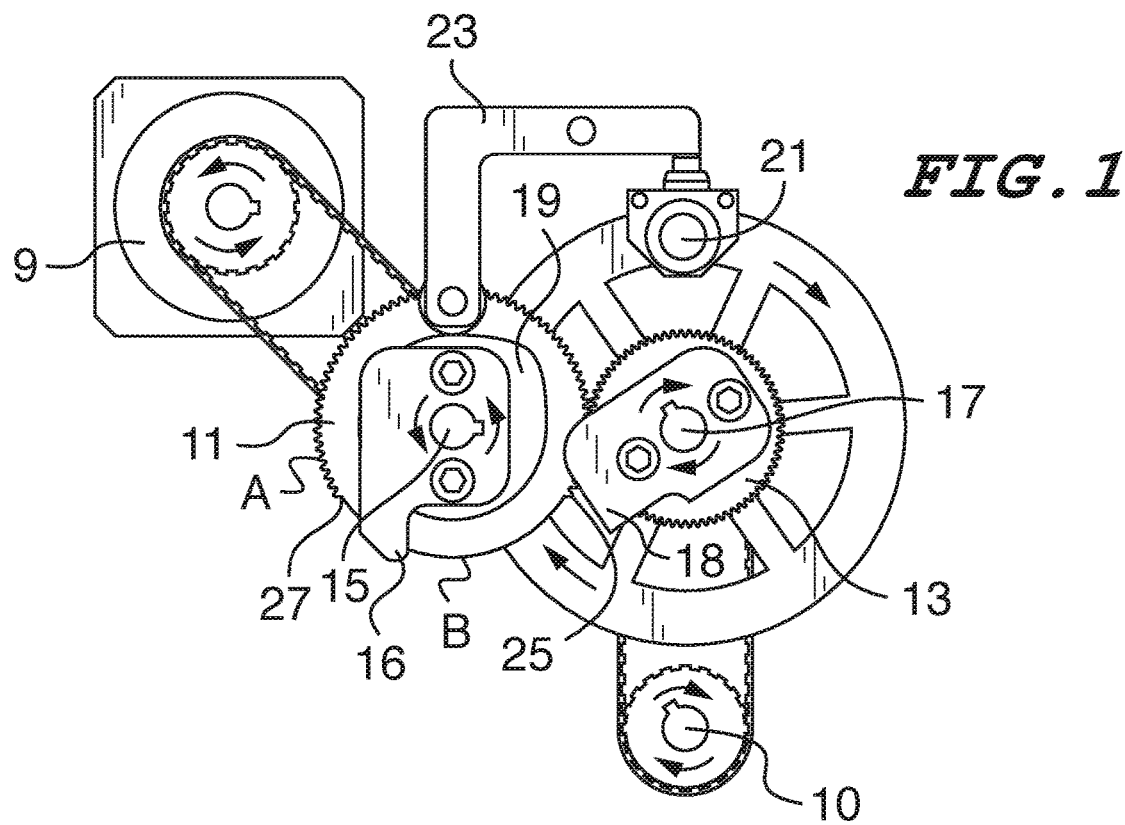
FIGS. 1 through 8 are elevation views which depict internal components of an example gearbox having an intermittent gear drive in eight sequential steps of its operation, according to one embodiment.

Referring now to FIG. 1, the main internal working components of a gear system of one embodiment of the invention is shown. A gearbox including a drive gear 11 and a coplanar driven gear 13 is interposed between a servo motor 9 and a belt-driven output device 10. The drive and driven gears 11 and 13 are rigidly affixed to input and output shafts 15 and 17, respectively. Speed-synchronizing coplanar pawls 16 and 18 are rigidly affixed to the input and output shafts 15 and 17 respectively and positioned laterally to the gears 11 and 13 respectively. A cam 19 is affixed to the input shaft 15 which actuates a disc brake 21 affixed to the output shaft 17 via a brake arm follower 23. The arrows depict the direction of rotation of the components.

The drive gear 11 consists of two arc segments on its peripheral circular outer surface, a toothed segment "A" and a toothless segment "B". In the position of the gears seen in FIG. 1, teeth on the drive gear 11 are in mesh with teeth on the driven gear 13 at a mesh point which lies on a line between the shafts 15 and 17 where the gears 11 and 13 can engage. The mesh point is hidden from view behind the pawl 18 in FIG. 1 but can be seen clearly in FIGS. 7 and 8 as feature 29. The toothed segment "A" has a leading end 27 and a trailing end 25 which are also at the ends of the contiguous toothless segment "B". The following FIGS. 2-8 show the sequential operation of the gear box as the drive gear 11 is rotated by the servo motor 9.

Figure 2:
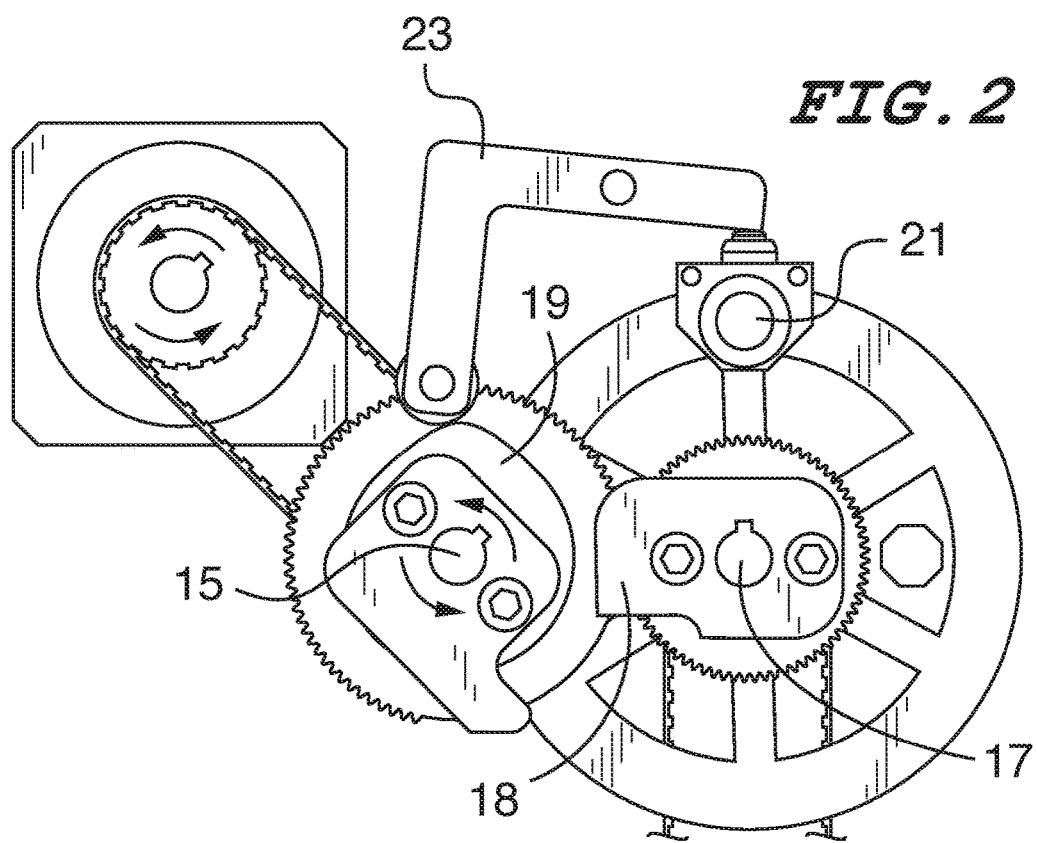

In FIG. 2 we see that rotation of the drive gear 11 has by direct drive rotated the driven gear 13 to a point where the pawl 18 is adjacent the mesh point. For the sake of this description this position of the pawl 18 will be referred as its starting position. At this position of the elements, the cam 19 is located on the input shaft 15 so that its single lobe has rotated into engagement with the pivoted brake arm follower 23 to briefly actuate the output shaft brake 21. The output shaft 17 is thereby positively halted by the brake 21 which counteracts the rotational inertia of the output shaft 17 and its connected components. These structures are arranged so that simultaneously the toothless segment "B" of the drive gear 11 has reached the mesh point. Hence, the direct mechanical connection between the shafts 15 and 17 is interrupted allowing the output shaft 17 to be halted. The brake means 21 shown in this embodiment is a disc brake but may be any other type of brake or other means which provides a selectively actuatable stopping of the output shaft rotation. For applications where the output shaft 17 is not required to stop at a predetermined point the brake 21 can be eliminated.

This begins a dwell period of the gearbox where the servo motor 9 is free from the inertial load of the output components connected to the output shaft 17 so that it can freely and timely decelerate. This period may be advantageously used for the purpose of decelerating the servo motor 9 to an indexed home position and then accelerated to a run speed. The indexing of the servo motor 9 during each operating cycle prevents error accumulation in the timing with other machine components of the greater operating system.

Figure 3:
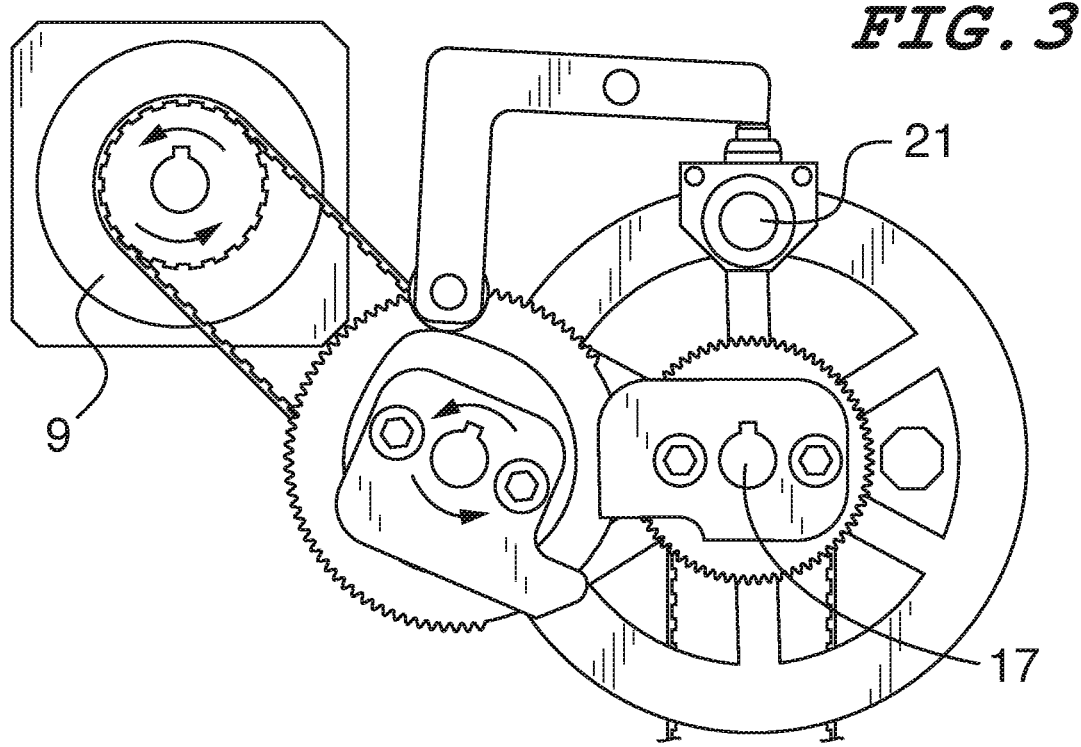

In FIG. 3, the drive gear 11 has rotated farther with its toothless segment B continuing to be presented at the mesh point. The output shaft 17 remains halted by its static inertia even though the brake 21 has been released. As mentioned above, during this dwell period the servo motor 9 may decelerate, stop and then accelerate if desired.

Figure 4:
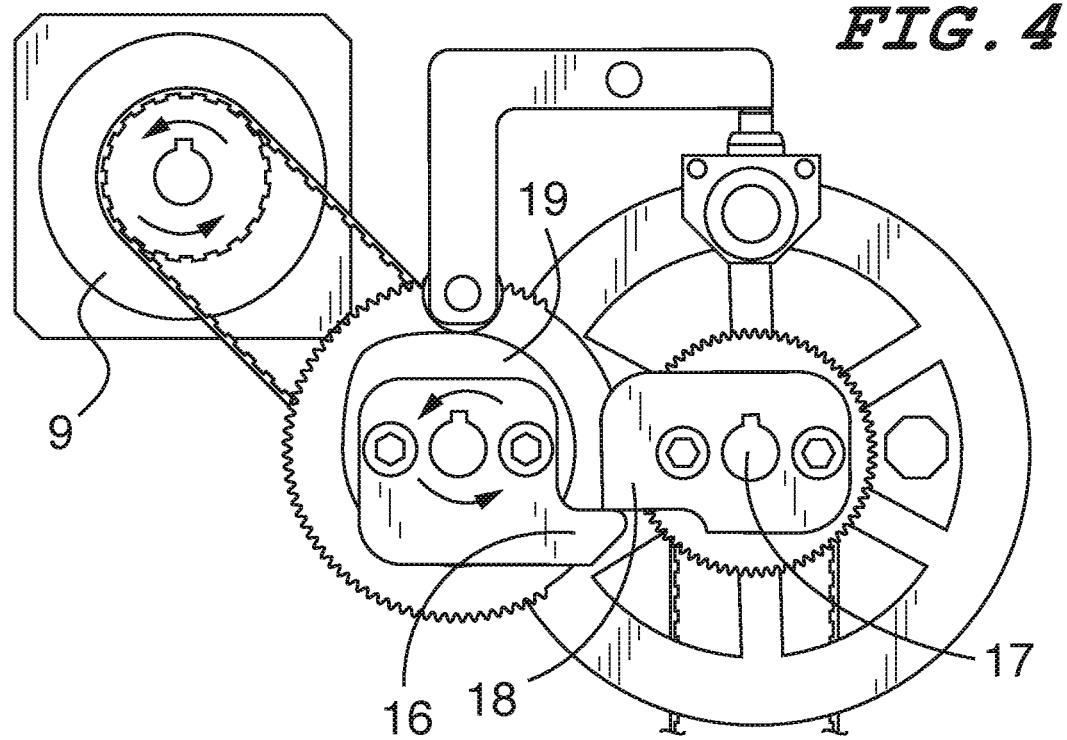
Figure 5:
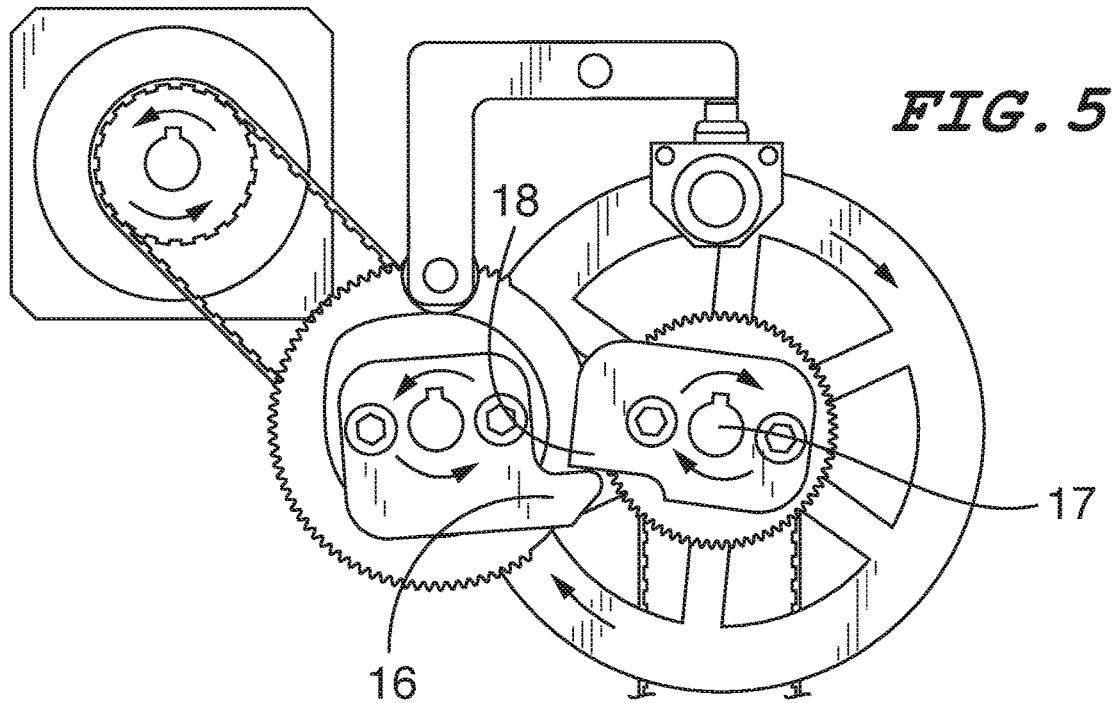

In FIG. 4, at this rotational point of the drive gear 11, the pawl 16 (e.g., input pawl, drive pawl, first pawl) and the pawl 18 (e.g., output pawl, driven pawl, second pawl) first engage. Like the drive and driven gears 11 and 13, the drive and driven pawls 16 and 18 are coplanar. Each pawl is a single radial pawl positioned laterally to the drive and driven gears 11 and 13 and are located immediately adjacent thereto. The pawls 16 and 18 each extend radially beyond the circumference of their laterally adjacent gear 11 and 13. The contacting surfaces of the pawls 16 and 18 are maximized to distribute the impact force over a greater area. Since the brake 21 has been released by the cam 19 and the toothless segment B of the drive gear 11 is still adjacent the mesh point, the output shaft 17 is turned only by the interaction of the pawls 16 and 18 independent of the drive gear teeth and as seen in the further rotation of FIG. 5. The output shaft 17 now begins its abrupt acceleration from the halted starting position by the direct impact of the pawls 16 and 18.

Figure 6:
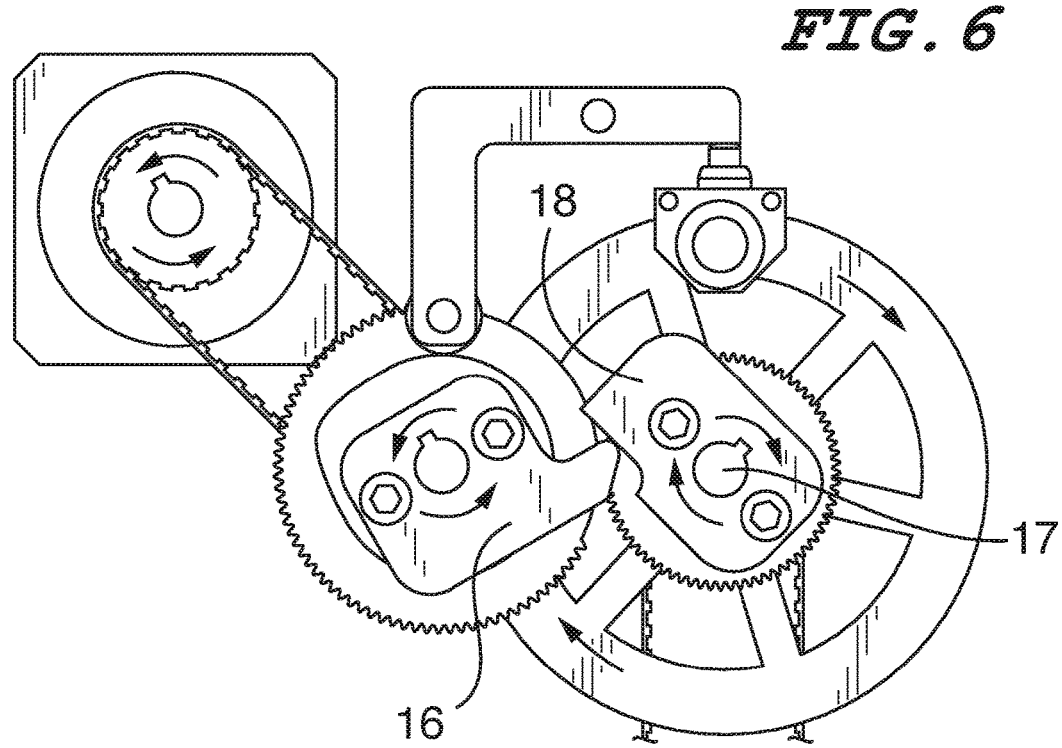

Referring now to FIG. 6, the pawl 16 has accelerated the speed of the output shaft 17 to match that of the input shaft 15. The pawls 16 and 18 are located on their respective shaft 15 and 17 such that the first pawl 16 is in engagement with the second pawl 18 only when the shafts 15 and 17 are in a position of disengagement and the brake 21 is not applied. As the drive gear 11 turns farther to a position between the positions of FIGS. 6 and 7 the leading end of the drive gear toothed segment A reaches the mesh point with the teeth of the driven gear 13. At this point the pawls 16 and 18 simultaneously disengage. This point where the pawls 16 and 18 disengage establishes a repeatable positional relationship between the input and output shafts 15 and 17 every operating cycle which prevents any positional error accumulation. The speed synchronization provides a smooth engagement of the gear teeth while they take over the transmission of torque to the output shaft 17.

Figure 7:
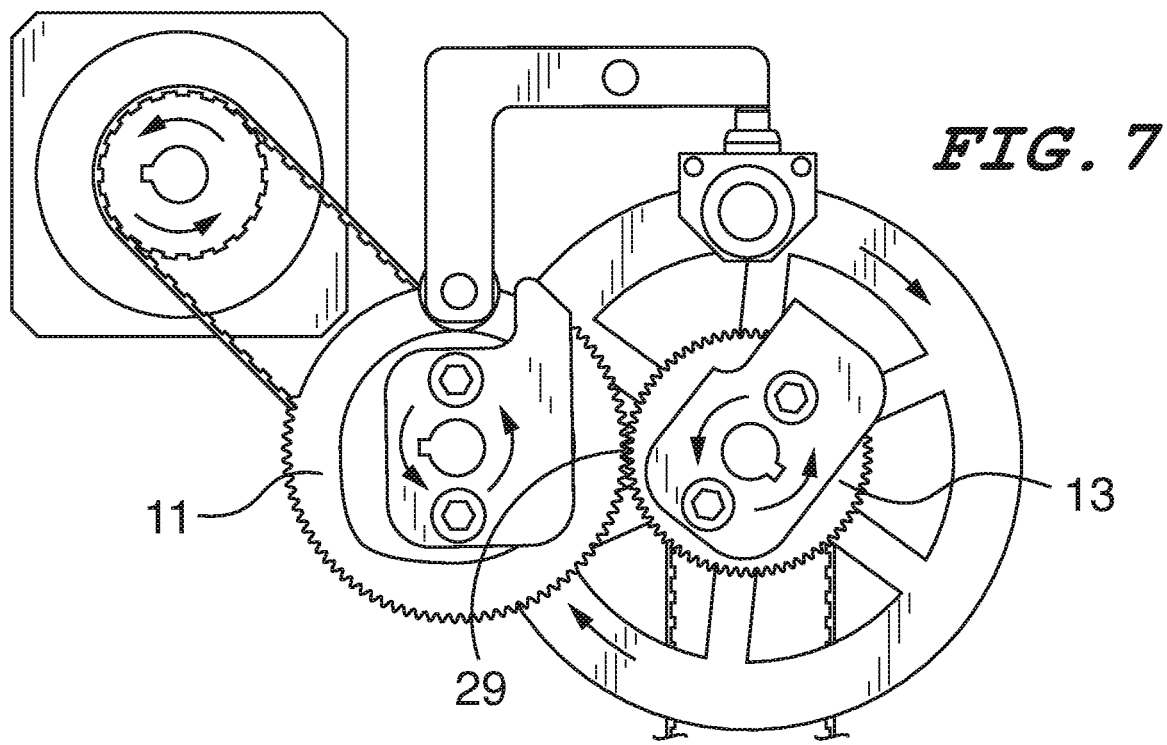
Figure 8:
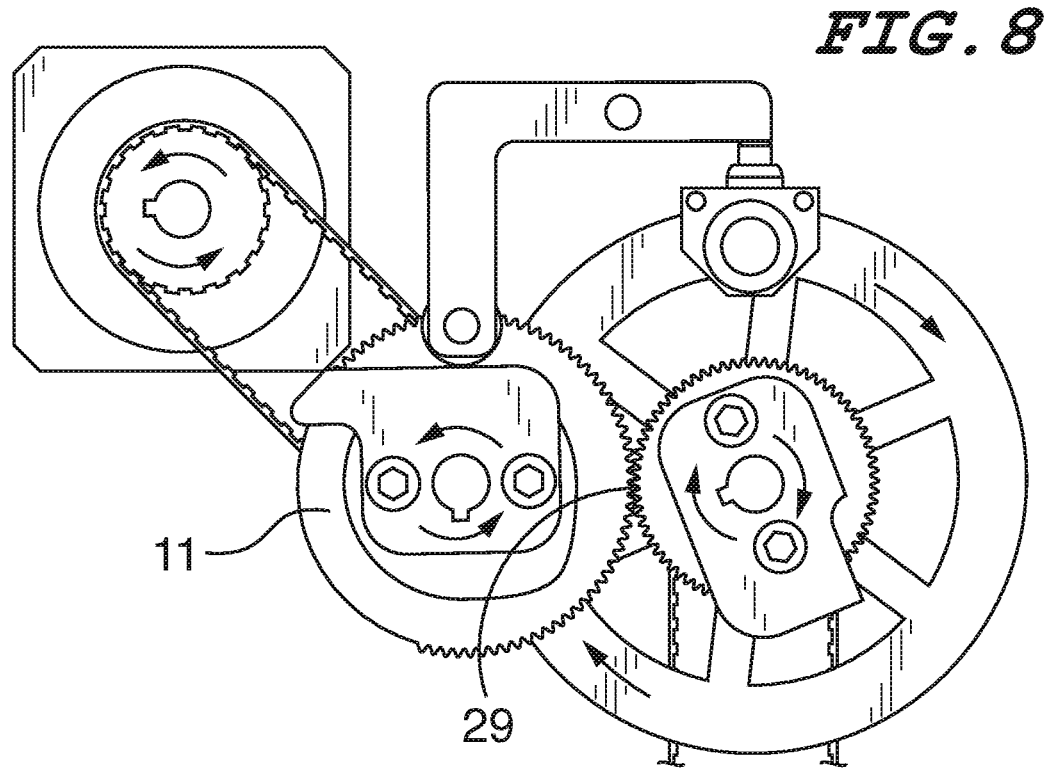

In FIGS. 7 and 8, as the shafts are turned farther the output shaft 17 continues connected to the input shaft 15 by direct drive of their respective meshing gear teeth. This direct gear drive interval during the power transmission phase of the gearbox operation provides a constant or linear rotational relationship between the input and output shafts 15 and 17. A linear drive system can be important is some motion control applications where related components of the greater operating system require a constant speed output of the gearbox. The number of teeth on the drive gear 11 is selected so that the driven gear 13 is returned to its starting position as the trailing end of the drive gear toothed segment A reaches the mesh point. In this way, every 360 degrees of rotation of the drive gear 11 will result in 360 degrees of rotation of the driven gear 13. This allows the operational cycle to be repeatable as the output shaft 17 leaves and is returned to its starting position for every 360 degrees of rotation of the input shaft 15.

Further turning of the drive gear 11 from the position shown in FIG. 8 places the gearbox back in the original position seen in FIG. 1, thus completing one operating cycle.

Thus, from the foregoing description of the preferred embodiment of the invention it will be apparent to those of skill in the art that the objects of the invention have been achieved. Other objects and advantages of the invention will be apparent to those of skill in the art from the foregoing description of but one embodiment of the invention but not to be limited thereto. It should be understood that the invention shall be limited only by the following claims and their legal equivalents.

What is claimed is:

1. A gear system for converting continuous rotary motion to intermittent rotary motion comprising:
   an input shaft;
   an output shaft positioned in spaced parallel relation to the input shaft;
   a drive gear wheel rigidly affixed to the input shaft having two arc segments on its circular outer surface, a toothed segment and a toothless segment, wherein the toothed segment has a leading end and a trailing end;
   a driven gear wheel rigidly affixed to the output shaft having gear teeth engaged with teeth of the toothed segment of the drive gear wheel at a mesh point, wherein the input shaft and the output shaft have positions of disengagement when the toothless arc segment of the drive gear wheel lies adjacent the mesh point;
   a brake means affixed to the output shaft for halting its motion; and
   two speed-synchronizing pawls, a first pawl rigidly affixed to the input shaft and a second pawl rigidly affixed to the output shaft, wherein the first pawl and the second pawl are located on the input shaft and the output shaft respectively.

2. The device of claim 1, wherein the brake means is a disc brake.

3. The device of claim 1, wherein a number of gear teeth on the drive gear wheel toothed arc segment is selected in relation to a number of gear teeth on the driven gear wheel such that the driven gear wheel is driven through 360 degrees of rotation during each 360-degree rotation of the drive gear wheel.

4. The device of claim 1, further comprising a brake actuator affixed to the input shaft to actuate the brake means momentarily during rotation of the input shaft when the trailing end of the toothed segment of the drive gear wheel leaves the mesh point at a position of disengagement.

5. The device of claim 4, wherein the brake actuator comprises a cam and a follower mechanism.

6. The device of claim 5, wherein the follower mechanism is a pivoted brake arm and the cam has a single lobe which operates upon the pivoted brake arm once every 360 degrees of rotation of the input shaft.

7. The device of claim 4, wherein the first pawl is in engagement with the second pawl only when the first shaft and the second shaft are in a position of disengagement and the brake is not applied.

8. The device of claim 4, wherein the first pawl and the second pawl are configured to disengage at a point of drive gear wheel rotation when the teeth at the leading end of the toothed segment first mesh with the gear teeth of the driven gear wheel.

9. The device of claim 8, wherein the brake means is actuated when the trailing end of the toothed segment of the drive gear wheel first disengages from the driven gear wheel.

10. The device of claim 9, wherein the second pawl on the output shaft is pointed toward the input shaft and located at its point of closest proximity to the input shaft when the brake means is actuated.

11. The device of claim 10, wherein power transmission between the input shaft and the output shaft is interrupted simultaneously when the brake is actuated until the first pawl and the second pawl engage after further rotation of the input shaft.

12. The device of claim 1, further comprising a drive motor connected to the input shaft.

13. The device of claim 1, further comprising driven machine components connected to the output shaft.

14. A gear system for converting continuous rotary motion to intermittent rotary motion, comprising:
    an input shaft;
    an output shaft positioned in spaced parallel relation to the input shaft;
    a drive gear wheel rigidly affixed to the input shaft having two arc segments on its circular outer surface, a toothed segment and a toothless segment, wherein the toothed segment has a leading end and a trailing end;
    a driven gear wheel rigidly affixed to the output shaft having gear teeth engaged with teeth of the toothed segment of the drive gear wheel at a mesh point, wherein the input shaft and the output shaft have positions of disengagement when the toothless segment of the drive gear wheel lies adjacent the mesh point; and
    two speed-synchronizing pawls, a first pawl rigidly affixed to the input shaft and a second pawl rigidly affixed to the output shaft, wherein the first pawl and the second pawl are located on the input shaft and the output shaft respectively, said pawls are constructed and arranged such that the first pawl is in engagement with the second pawl only when the input shaft and the output shaft are in a position of disengagement and the speed of the driven gear matches the speed of the drive gear significantly prior to the leading end of the toothed segment reaching the mesh point.

15. The device of claim 14, wherein the drive gear wheel and the driven gear wheel are coplanar and the first pawl and the second pawl are coplanar.

16. The device of claim 15, wherein the first pawl and the second pawl are:
    single radially extending pawls; and
    positioned laterally to and located immediately adjacent to the drive gear wheel and the driven gear wheel respectively.

17. The device of claim 16, wherein the first pawl and the second pawl extend radially beyond a circumference of the drive gear wheel and the driven gear wheel respectively.

18. The device of claim 14, wherein the input shaft and the output shaft are engaged when the teeth of the drive gear wheel mesh with the gear teeth of the driven gear wheel thereby providing a linear rotational relationship between the input shaft and the output shaft.

* * * * *